(12) United States Patent
Shioiri et al.

(10) Patent No.: US 7,803,076 B2
(45) Date of Patent: Sep. 28, 2010

(54) BELT TYPE CONTINUOUSLY VARIABLE TRANSMISSION

(75) Inventors: Hiroyuki Shioiri, Susono (JP); Yasuo Hojo, Nagoya (JP); Hiroaki Kimura, Susono (JP); Ryuji Ibaraki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 522 days.

(21) Appl. No.: 10/582,231

(22) PCT Filed: Dec. 6, 2004

(86) PCT No.: PCT/IB2004/004009

§ 371 (c)(1),
(2), (4) Date: Jun. 9, 2006

(87) PCT Pub. No.: WO2005/057054

PCT Pub. Date: Jun. 23, 2005

(65) Prior Publication Data

US 2007/0117664 A1    May 24, 2007

(30) Foreign Application Priority Data

Dec. 9, 2003    (JP)    ............... 2003-409913

(51) Int. Cl.
F16H 9/16    (2006.01)
(52) U.S. Cl. ...................................... 474/28
(58) Field of Classification Search ............. 474/26, 474/18, 12, 28
See application file for complete search history.

(56) References Cited

U.S. PATENT DOCUMENTS

| | | | |
|---|---|---|---|
| 4,350,491 A * | 9/1982 | Steuer | 474/12 |
| 4,705,492 A | 11/1987 | Hattori et al. | |
| 5,201,687 A * | 4/1993 | Friedmann | 474/18 |
| 5,348,517 A | 9/1994 | Dick | |
| 5,527,225 A * | 6/1996 | Dick | 474/12 |
| 6,669,588 B2 * | 12/2003 | Schmid | 474/18 |
| 6,689,000 B1 * | 2/2004 | Kapaan et al. | 474/20 |
| 6,786,844 B2 * | 9/2004 | Fritzer et al. | 475/210 |
| 2002/0155909 A1 | 10/2002 | Roby | |
| 2002/0183146 A1 * | 12/2002 | Yoshida et al. | 474/23 |

FOREIGN PATENT DOCUMENTS

| | | | |
|---|---|---|---|
| GB | 929326 A * | 6/1963 | |
| JP | 64-12960 | 1/1989 | |
| JP | 3-265747 | 11/1991 | |
| JP | 06249310 | 9/1994 | |

(Continued)

*Primary Examiner*—Robert A Siconolfi
*Assistant Examiner*—Anna Momper
(74) *Attorney, Agent, or Firm*—Oblon, Spivak, McClelland, Maier & Neustadt, L.L.P.

(57) ABSTRACT

A belt type continuously variable transmission is provided with two pulley shafts arranged in parallel a predetermined distance apart from each other, a movable sheave provided on each pulley shaft and being able to slide in an axial direction thereof, a fixed sheave arranged on each pulley shaft so as to face the moveable sheave, the fixed sheave and the movable sheave that face each another on each pulley shaft together forming a groove therebetween, and a belt wound around the grooves. At least one of the movable sheaves and a motor serving as a driving source for the moving sheave are integrally provided.

20 Claims, 10 Drawing Sheets

FOREIGN PATENT DOCUMENTS

| | | |
|---|---|---|
| JP | 7-243490 | 9/1995 |
| JP | 08285033 | 11/1996 |
| JP | 2001-317608 | 11/2001 |
| JP | 2001-349401 | 12/2001 |
| JP | 2001-355697 | 12/2001 |
| JP | 2002-541399 | 12/2002 |
| WO | 00/49313 | 8/2000 |

* cited by examiner

BELT TYPE CONTINUOUSLY VARIABLE TRANSMISSION

BACKGROUND OF THE INVENTION

1. Field of the Invention

The invention relates to a belt type continuously variable transmission. More particularly, the invention relates to an improvement of a belt type continuously variable transmission provided with a movable sheave sliding mechanism that slides a movable sheave in the axial direction.

2. Description of the Related Art

A belt type continuously variable transmission (hereinafter also referred to as simply "belt type CVT") is typically provided with two rotating shafts arranged parallel with one another, a primary pulley attached to one of the rotating shafts and a secondary pulley attached to the other of the rotating shafts, and a belt wound around V-shaped grooves in the primary and secondary pulleys. The primary and secondary pulleys each have an upright fixed sheave that is fixed to the rotating shaft (i.e., the primary shaft and the secondary shaft), and an upright movable sheave which slides in the axial direction on the rotating shaft. The V-shaped grooves are formed by slanted portions of the fixed sheaves and corresponding slanted portions of the movable sheaves which face the slanted portions of the fixed sheaves.

In this kind of belt type CVT, the speed ratio can be changed continuously by changing the width of the V-shaped grooves by sliding the movable sheaves in the axial direction of the rotating shafts such that the contact radius of the belt and each of the primary and secondary pulleys changes continuously. That is, since the ratio of the contact radius on the primary pulley side and the contact radius on the secondary pulley side determines the speed ratio of the belt type CVT, this belt type CVT is able to change speed ratios continuously by controlling the width of the grooves of the primary and secondary pulleys.

In a conventional belt type CVT, the movable sheave must be slid in the direction of the rotational axis in order to change speed ratios, so a mechanism (a movable sheave sliding mechanism) is provided in the belt type CVT to slide the movable sheave of the primary pulley. For example, one such movable sheave sliding mechanism slides the movable sheave using driving force from a motor such as an electric motor or a hydraulic motor. JP(A) 6-249310, for example, discloses a belt type continuously variable transmission with just such a movable sheave sliding mechanism.

The movable sheave sliding mechanism in JP(A) 6-249310, however, has the motor positioned at a distance from the movable sheave, and multiple gears for transmitting the driving power from the motor to the movable sheave disposed between the motor and the primary pulley. As a result, room must be made for the movable sheave sliding mechanism which increases the size of the transmission, which is undesirable.

SUMMARY OF THE INVENTION

In view of the foregoing problems, this invention thus provides a belt type continuously variable transmission which improves upon the conventional art by enabling a movable sheave sliding mechanism and the transmission to be made compact.

Thus, a first aspect of the invention relates to a belt type continuously variable transmission provided with two pulley shafts arranged in parallel a predetermined distance apart from each other, a movable sheave on each pulley shaft, the movable sheaves being able to slide in an axial direction on the pulley shafts, a fixed sheave arranged on each pulley shaft so as to face the moveable sheave on each pulley shaft, the fixed sheave and the movable sheave that face each another on each pulley shaft together forming a groove therebetween, and a belt wound around the grooves between the moveable sheaves and the fixed sheaves that face one another, in which at least one of the movable sheaves and a motor serving as a driving source for the moving sheave are integrally provided.

According to the first aspect of the invention, the motor and the movable sheave are able to be situated in a compact manner, thereby enabling the structure for sliding the movable sheave to be compact, which in turn enables the transmission itself to be compact.

According to a second aspect of the invention, the belt type continuously variable transmission of the first aspect of the invention further includes an integral rotating mechanism which rotates the motor integrally with the movable sheave, and a relative moving mechanism that moves the motor and the sheave relative to one another in the axial direction.

According to the second aspect of the invention, the movable sheave is moved relative to the motor only when necessary (e.g., when the movable sheave is slid in the axial direction) and rotates integrally with the motor at all other times. As a result, in addition to achieving the effects displayed by the first aspect of the invention, loss due to needless relative rotation and friction and the like between the motor and the movable sheave is able to be reduced.

According to a third aspect of the invention, in the belt type continuously variable transmission of the first or second aspects of the invention, a moving direction converting mechanism that converts force in the direction of rotation, which is driving force from the motor, into force in the axial direction is provided between, and directly on, the motor and the movable sheave.

According to the third aspect of the invention, driving force from the motor can be transmitted to the moving sheave without using a set of gears. As a result, in addition to achieving the effects displayed by the first and second aspects of the invention, the movable sheave sliding mechanism and the transmission can be made even more compact and driving loss at the movable sheave sliding mechanism can be reduced because the driving loss at the set of gears is eliminated.

According to a fourth aspect of the invention, in the belt type continuously variable transmission of the first or second aspects of the invention, the motor is provided with an inner rotor which is integrated with the pulley shaft and an outer rotor which generates driving force by rotating relative to the inner rotor. Also, the pulley shaft is provided with a bearing that rotates the outer rotor relative to the pulley shaft, and a moving direction converting mechanism that converts force in the direction of rotation of the outer rotor to force in the axial direction is provided between the outer rotor and the movable sheave.

According to the fourth aspect of the invention, driving force from the motor can be transmitted to the movable sheave by the moving direction converting mechanism without using a set of gears. As a result, in addition to achieving the effects displayed by the first and second aspects of the invention, the movable sheave sliding mechanism and the transmission can be made even more compact and driving loss at the movable sheave sliding mechanism can be reduced because the driving loss at the set of gears is eliminated. Further, the pulley shaft can receive the reaction force caused by the thrust of the motor via the bearing and the relative rotation between the outer rotor and the pulley shaft can be limited by the stroke in the sliding direction of the movable sheave so loss at the bearing can be reduced.

According to a fifth aspect of the invention, in the belt type continuously variable transmission of the first, second, third, or fourth aspects of the invention, a hydraulic pressure chamber which pushes the movable sheave toward the fixed sheave using hydraulic pressure is provided in serial with the motor in the axial direction.

According to the fifth aspect of the invention, the movable sheave can be pushed toward the fixed sheave by hydraulic pressure in the hydraulic pressure chamber. As a result, in addition to achieving the effects displayed by the first, second, third, or fourth aspects of the invention, output of the motor can be reduced, which enables the motor to be more compact, in turn enabling the transmission itself to be more compact.

According to a sixth aspect of the invention, in the belt type continuously variable transmission of the fifth aspect of the invention, at least one wall surface that forms the hydraulic pressure chamber is formed by the motor.

According to the sixth aspect of the invention, the motor and the movable sheave can be situated in a compact manner when forming the hydraulic pressure chamber. As a result, in addition to achieving the effects displayed by the fifth aspect of the invention, the transmission itself can be made even more compact.

According to a seventh aspect of the invention, in the belt type continuously variable transmission of the sixth aspect of the invention, the motor is a hydraulic motor and an oil chamber in the motor and the hydraulic pressure chamber are arranged facing one another in the axial direction across the wall surface formed by the motor.

According to the seventh aspect of the invention, the internal pressure between the oil chamber in the motor and the hydraulic pressure chamber can be made to cancel out. As a result, in addition to achieving the effects displayed by the sixth aspect of the invention, the wall surface of the motor can be made thinner, thereby further reducing the weight of the motor.

Also, according to an eighth aspect of the invention, in the belt type continuously variable transmission of the seventh aspect of the invention, the oil chamber in the motor and the hydraulic pressure chamber are connected to each other.

According to the eighth aspect of the invention, hydraulic fluid is able to flow back and forth between the oil chamber in the motor and the hydraulic pressure chamber. As a result, in addition to achieving the effects displayed by the seventh aspect of the invention, the amount of hydraulic fluid consumed can be reduced, which in turn enables the oil pump to be of a smaller capacity.

Furthermore, according to a ninth aspect of the invention, in the belt type continuously variable transmission of any one of the first through the eighth aspects of the invention, one of the pulley shafts is a primary side pulley shaft and the other of the pulley shafts is a secondary side pulley shaft, a movable sheave provided integrally with the motor is arranged on the primary side pulley shaft, and a plurality of pushing mechanisms that push the movable sheave toward the fixed sheave are provided on the movable sheave on the secondary side pulley shaft.

According to the ninth aspect of the invention, squeezing force is generated between the movable sheave and the fixed sheave. As a result, in addition to achieving the effects displayed by the any one of the first through the eighth aspects of the invention, it is also possible to prevent the belt from slipping. In addition, control over the squeezing force can be improved if that squeezing force is divided between pushing mechanisms and at least one of those pushing mechanisms operates by hydraulic pressure, for example.

Also, according to a tenth aspect of the invention, in the belt type continuously variable transmission of the ninth aspect of the invention, at least one of the pushing mechanisms is a torque cam.

According to the tenth aspect of the invention, the torque cam rotates relative to the moveable sheave when squeezing force is generated. As a result, in addition to achieving the effects displayed by the ninth aspect of the invention, torsion between the fixed sheave and the movable sheave can be suppressed.

Also, according to an eleventh aspect of the invention, in the belt type continuously variable transmission of the tenth aspect of the invention, an absorbing mechanism that makes the torque cam operate smoothly is provided on the fixed sheave on the secondary side pulley shaft or the movable sheave on the secondary side pulley shaft.

According to the eleventh aspect of the invention, in addition to achieving the effects displayed by the tenth aspect of the invention, shock generated when the clearance in the torque cam is taken up during a speed ratio change (i.e., when the torque cam is switched between the driving and driven states) can be reduced.

Also, according to a twelfth aspect of the invention, in the belt type continuously variable transmission of the eleventh aspect of the invention, a structure which changes the degree of absorption according to the speed ratio is provided in the absorbing mechanism.

According to the twelfth aspect of the invention, in addition to achieving the effects displayed by the eleventh aspect of the invention, even when the speed ratio is different, shock generated when the clearance in the torque cam is taken up during a speed ratio change (i.e., when the torque cam is switched between the driving and driven states) can be reduced according to that speed ratio.

In this way, the belt type continuously variable transmission according to this invention provides the motor and the movable sheave integrally, which enables the movable sheave sliding mechanism to be more compact, in turn enabling the transmission itself to be made more compact.

BRIEF DESCRIPTION OF THE DRAWINGS

The foregoing and/or further objects, features and advantages of this invention will become more apparent from reading the following description of preferred embodiments with reference to the accompanying drawings, in which like numerals are used to represent like elements and wherein.

DETAILED DESCRIPTION OF THE PREFERRED EMBODIMENTS

In the following description and the accompanying drawings, the present invention will be described in more detail in terms of exemplary embodiments. It is to be understood that the invention is not to be limited in any way to these exemplary embodiments.

A belt type continuously variable transmission according to a first exemplary embodiment of the invention will be described with reference to FIGS. 1 to 7B.

First, the overall structure of a power transmitting apparatus provided with the belt type continuously variable transmission according to the invention will be described with reference to FIG. 1.

This power transmitting apparatus includes an internal combustion engine 10 and a transaxle 20 arranged on the output side of the internal combustion engine 10.

Figure 1:
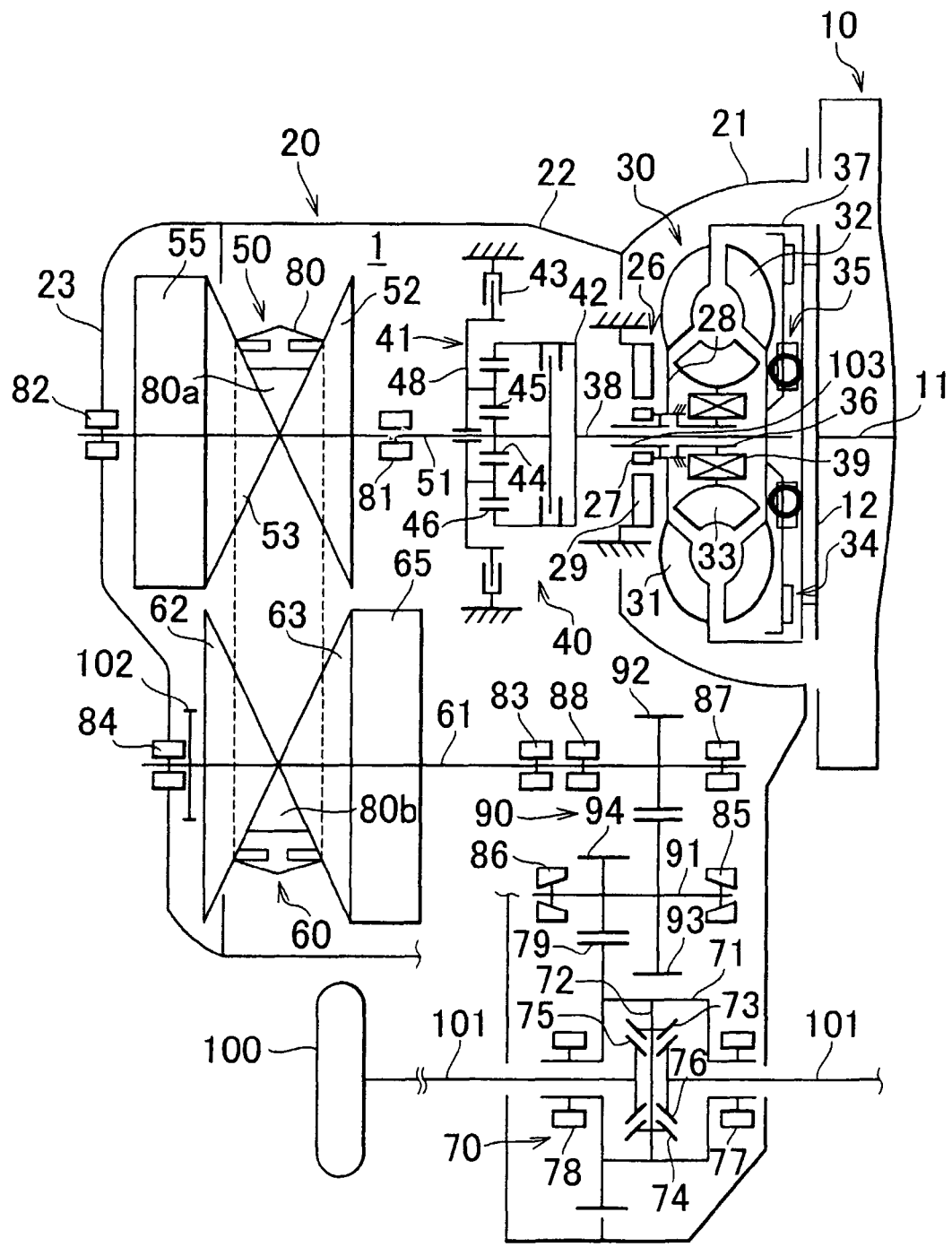
FIG. 1 is a skeleton view of the overall structure of a power transmitting apparatus provided with a belt type continuously variable transmission according to a first exemplary embodiment of the invention.

Referring to FIG. 1, this transaxle 20 includes, in order from the output side of the internal combustion engine 10, a transaxle housing 21 mounted to the internal combustion engine 10, a transaxle case 22 mounted to the transaxle housing 1 and a transaxle cover 23 mounted to the transaxle case 22, all of which encase the transaxle 20.

First, a torque converter (propulsion unit) 30 is housed in the transaxle housing 21. This torque converter 30 increases the torque from the internal combustion engine 10 and transmits it to a belt type continuously variable transmission (hereinafter also referred to as simply "belt type CVT") 1, which will be described later. The torque converter 30 includes a pump impeller 31, a turbine runner 32, a stator 33, a lockup clutch 34, and a damper unit 35 and the like.

In addition, an input shaft 38 which can rotate about the same axis as a crankshaft 11 of the internal combustion engine 10 is also provided in the transaxle housing 21. The turbine runner 32 is mounted to an end portion, on the internal combustion engine 10 side, of the input shaft 38. The lockup clutch 34 is also mounted via the damper unit 35 to the same end of the input shaft as the turbine runner 32.

Meanwhile, a front cover 37 of the torque converter 30 is coupled to an end portion on the transaxle 20 side of the crankshaft 11, and the pump impeller 31 is connected to this front cover 37.

The pump impeller 31 is arranged facing the turbine runner 32, with the stator 33 on the inside between the two. Also, a hollow shaft 36 connected to the transaxle housing 21 (or the transaxle case 22) is coupled to the stator 33 via a one-way clutch 39, with the input shaft 38 being arranged inside the hollow shaft 36.

Hydraulic fluid is supplied in a casing (not shown) formed by the front cover 37 and the pump impeller 31 and the like described above.

Next, operation of the torque converter 30 will be described.

First, torque from the internal combustion engine 10 is transmitted from the crankshaft 11 to the front cover 37 via a drive plate 12. When the lockup clutch 34 is released by the damper unit 35, the torque transmitted to the front cover 37 is transmitted to the pump impeller 31. Hydraulic fluid circulating between the pump impeller 31 and the turbine runner 32 transmits this torque to the turbine runner 32, which in turn transmits it to the input shaft 38.

An oil pump (hydraulic pump) 26 shown in FIG. 1 is provided between the torque converter 30 and a forward-reverse switching mechanism 40, which will be described later. The oil pump 26 is connected to the pump impeller 31 via a cylindrical hub 28 by a rotor 27. A body (case) 29 of the oil pump 26 is fixed to the transaxle case 22 side. Also, the hub 28 is spline-fitted to a hollow shaft 103. According to the structure described above, power from the internal combustion engine 10 is transmitted to the rotor 27 via the pump impeller 31, thus making it possible to drive the oil pump 26.

Next, the forward-reverse switching mechanism 40, the belt type CVT 1, and a final reduction gear 70 which makes up a differential gear unit are housed in the transaxle case 22 and transaxle cover 23.

First, the forward-reverse switching mechanism 40 includes a planetary gear set 41, a forward clutch 42, and a reverse brake 43, and transmits torque from the internal combustion engine 10 which has been transmitted to the input shaft 38 in the torque converter 30 to a primary pulley 50 of the belt type CVT 1, which will be described later.

The planetary gear set 41 includes a sun gear 44, a plurality of (e.g., three) pinions (planetary pinions) 45, and a ring gear 46.

The sun gear 44 is spline-fitted to a coupling member (not shown). This coupling member is spline-fitted to a primary shaft (pulley shaft) 51 which is a rotating shaft of the primary pulley 50. According to this structure, torque transmitted to the sun gear 44 is then transmitted to the primary shaft 51.

Further, the pinions 45 are arranged around, and in mesh with, the sun gear 44. The pinions 45 are supported on a carrier 48 so as to be able to rotate independently and freely as well as together as a group around the sun gear 44. This carrier 48 is connected at an outer peripheral edge portion to the reverse brake 43.

Further, the ring gear 46 is in mesh with each pinion 45 supported on the carrier 48, and is connected to the input shaft 38 in the torque converter 30 via the forward clutch 42.

The forward clutch 42 is controlled on and off by hydraulic fluid supplied to the hollow portion of the input shaft 38. A brake piston (not shown) is used for this on/off control. During forward running, the forward clutch 42 is on and the reverse brake 43 is off. During reverse running, the forward clutch 42 is off and the reverse brake 43 is on.

Next, the general structure of the belt type continuously variable transmission 1 will be described. This belt type CVT 1 includes the primary shaft (pulley shaft) primary shaft 51 arranged concentric with the input shaft 38 and a secondary shaft (pulley shaft) 61 arranged in parallel with, and spaced at a predetermined distance from, the primary shaft 51. This primary shaft 51 is rotatably supported by bearings 81 and 82 shown in FIG. 1. The secondary shaft 61 is rotatably supported by bearings 83 and 84 shown in FIG. 1.

First, the primary pulley 50 shown in FIG. 1 is provided on the primary shaft 51. This primary pulley 50 includes a fixed sheave 52 integrally arranged on the outer periphery of the primary shaft 51 and a movable sheave 53 that can slide in the axial direction of the primary shaft 51.

Figure 2:
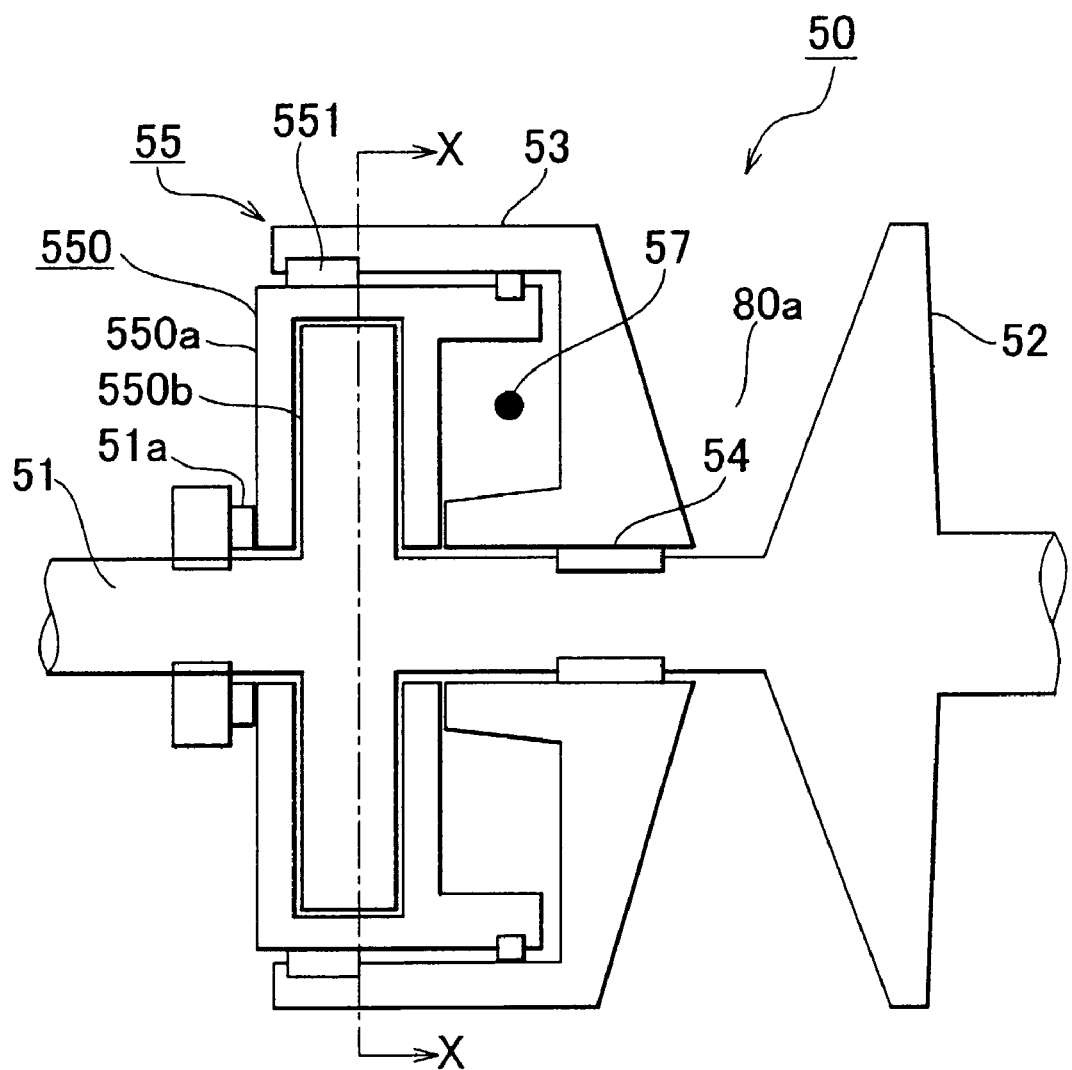
FIG. 2 is a view showing the structure of a primary pulley side with a hydraulic motor in the belt type continuously variable transmission according to the first exemplary embodiment of the invention.

This movable sheave 53 is spline-fitted to the primary shaft 51 with splines 54 shown in FIG. 2. Also, a V-shaped groove 80a is formed between the opposing surfaces of the fixed sheave 52 and movable sheave 53.

Further, a movable sheave sliding mechanism 55 is provided on the primary shaft 51. This movable sheave sliding mechanism 55 moves the movable sheave 53 closer to or away from the fixed sheave 52 by sliding it in the axial direction of the primary shaft 51. The movable sheave sliding mechanism 55 according to the first exemplary embodiment will now be described in more detail.

As shown in FIG. 2, the movable sheave sliding mechanism 55 is provided with a hydraulic motor 550 which is a driving source for sliding the movable sheave 53 in the axial direction of the primary shaft 51, and a moving direction converting mechanism 551 that converts the driving force (i.e., the driving force in the direction of rotation) of the hydraulic motor 550 to a force in the sliding direction of the movable sheave 53.

Figure 3:
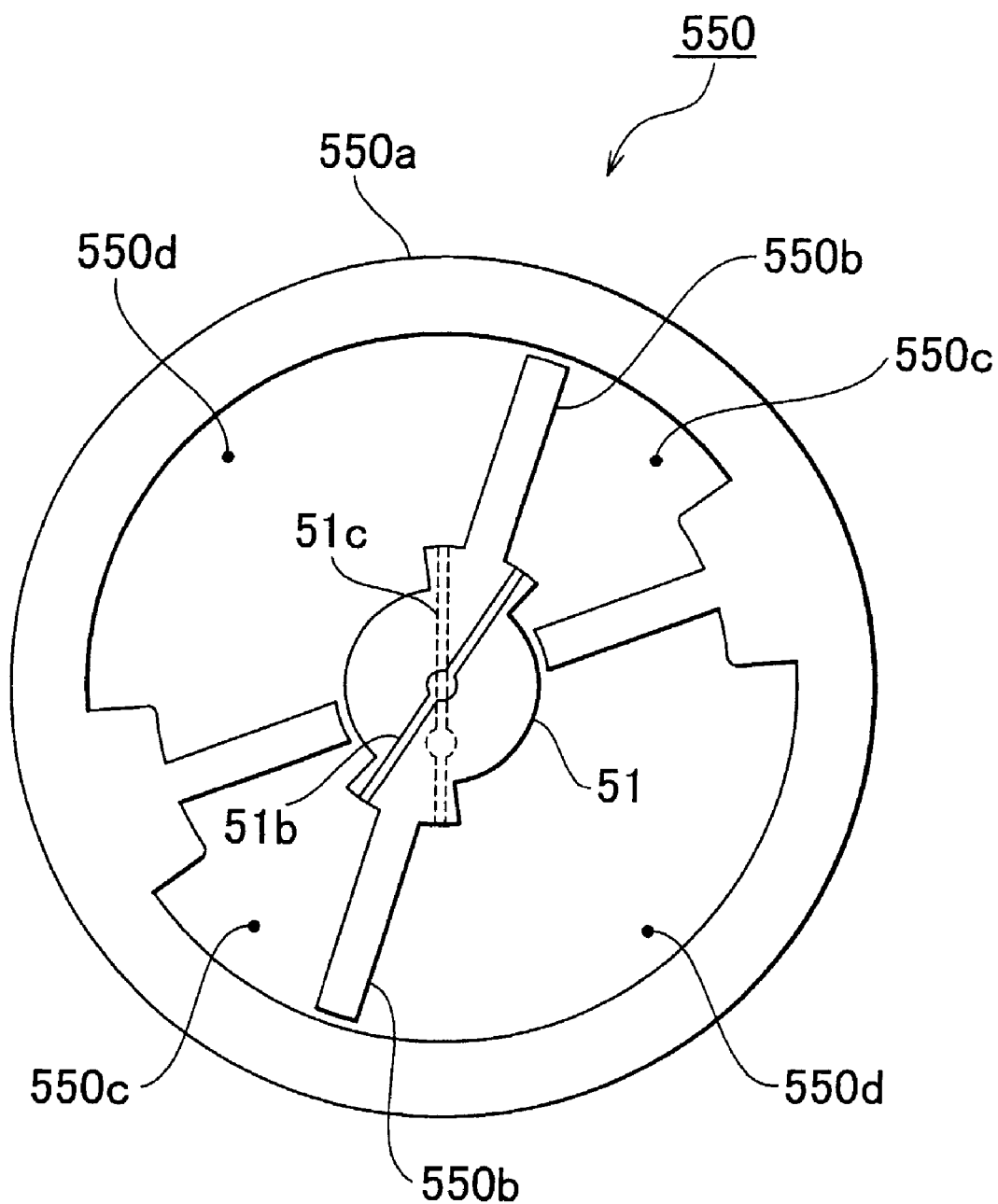
FIG. 3 is a sectional view of the hydraulic motor as shown taken along line X-X in FIG. 2.

First, a motor which uses the rotation of an outer rotor generated by the relative rotation between the outer rotor and an inner rotor as the driving force is used as the hydraulic motor 550 according to the first exemplary embodiment of the invention. As shown in FIG. 3, for example, a so-called vane motor is used which includes an outer rotor 550a and vanes (blades) 550b and 550b as the inner rotor. The vane motor rotates the outer rotor 550a using hydraulic fluid supplied to first oil chambers 550c and 550c (or second oil chambers 550d and 550d) formed between the outer rotor 550a and the inner rotors 550b and 550b. The vanes 550b and 550b in the first exemplary embodiment are integrally formed with the primary shaft 51.

The outer rotor 550a is arranged concentric with the primary shaft 51 in a hollow portion in the movable sheave 53 on the opposite side from the groove 80a. The outer rotor 550a is able to rotate relative to the primary shaft 51 around the rotational axis thereof via a bearing 51a shown in FIG. 2 which can rotate together with the primary shaft 51.

An outer peripheral portion of the outer rotor 550a is mounted to an inner wall surface of the hollow portion in the movable sheave 53, as shown in FIG. 2. For example, a so-called moving screw, such as a multiple thread screw or a sliding screw which converts rotational force of the outer rotor 550a into force in the axial direction of the outer rotor 550a, is used as the moving direction converting mechanism 551 in the first exemplary embodiment. As a result, a large amount of thrust is able to be generated with a relatively small amount of torque such that the output (torque) of the hydraulic motor 550 can be reduced. As a result, it is possible to improve efficiency by reducing the hydraulic pressure, as well as make the hydraulic motor 550 more compact.

Further, the moving direction converting mechanism 551 rotates the outer rotor 550a together (i.e., integrally) with the movable sheave 53 in the rotational direction of the primary shaft 51. Therefore, the moving direction converting mechanism 551 also functions as an integral rotating mechanism which integrally rotates the hydraulic motor 550 with the movable sheave 53.

In addition, the bearing 51a and the moving direction converting mechanism 551 together form a relative moving mechanism that enables relative movement between the movable sheave 53 and the hydraulic motor 550. For example, when the outer rotor 550a is rotated, this rotational force (torque) becomes the thrust of the hydraulic motor 550 for sliding the movable sheave 53 via the moving direction converting mechanism 551. A reaction force caused by the thrust acts on the bearing 51a, but since the bearing 51a is fixed to the primary shaft 51, the outer rotor 550a does not move at all in the direction of the reaction force. As a result, the movable sheave 53 moves relative to the hydraulic motor 550 and comes closer to the fixed sheave 52. In this way, when the outer rotor 550a is rotated, the movable sheave 53 can be slid in the axial direction of the primary shaft 51.

Also, since the bearing 51a is fixed to the primary shaft 51, the primary shaft 51 can receive the reaction force caused by the thrust of the hydraulic motor 550 via the bearing 51a. Moreover, the relative rotation between the outer rotor 550a and the primary shaft 51 is limited by the stroke in the sliding direction of the movable sheave 53. Therefore, in the first exemplary embodiment, the reaction force does not act on static systems such as the transaxle case 22 and the transaxle cover 23, and the bearing 51a rotates almost not at all, so loss at the bearing 51a can be reduced.

The vanes 550b and 550b of the hydraulic motor 550 are provided integrally with the primary shaft 51, as described above. Therefore, if the hydraulic motor 550 is not rotating, the outer rotor 550a of the hydraulic motor 550 rotates at the same speed as the primary shaft 51. If there is relative rotation between the outer rotor 550a and the vanes 550b and 550b, then the outer rotor 550a of the hydraulic motor 550 rotates at a different speed than the primary shaft 51.

Moreover, fluid passages 51b and 51c are provided in the primary shaft 51 (or vanes 550b and 550b) as shown in FIG. 3. The fluid passage 51b is connected to the first oil chambers 550c and 550c and supplies hydraulic fluid to, or drains hydraulic fluid from, the first oil chambers 550c and 550c. Similarly, the fluid passage 51c is connected to the second oil chambers 550d and 550d and supplies hydraulic fluid to, or drains hydraulic fluid from, the second oil chambers 550d and 550d.

Figure 4:
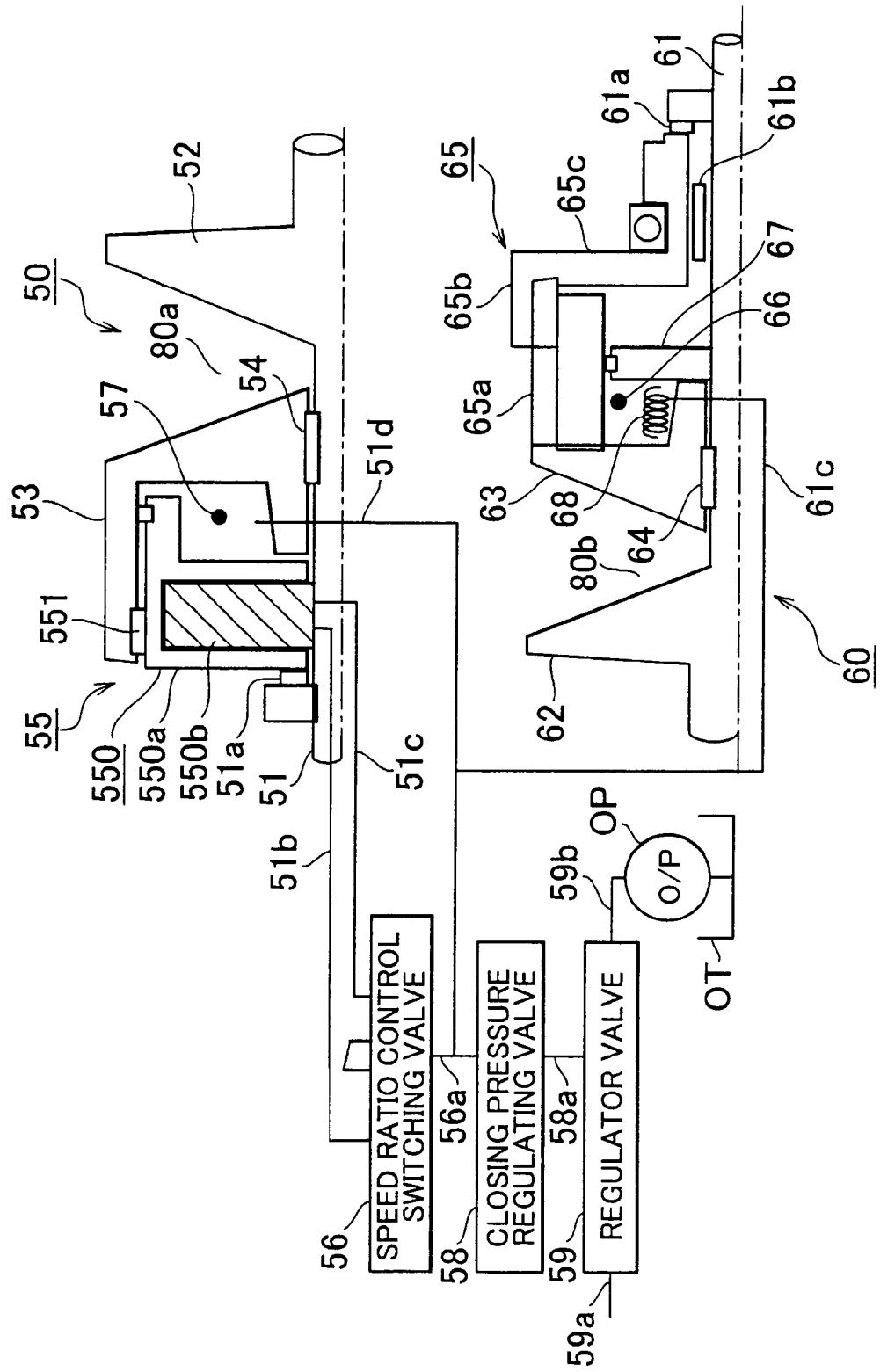
FIG. 4 is a view showing the stricture of a hydraulic pressure circuit in the belt type continuously variable transmission according to the first exemplary embodiment of the invention.

These fluid passages 51b and 51c are connected to a speed ratio control switching valve 56, as shown in FIG. 4. Hydraulic fluid is supplied to this speed ratio control switching valve 56 via an oil tank OT, an oil pump (O/P) OP, a fluid passage 59b, a regulator valve 59, a fluid passage 58a, a squeezing pressure regulating valve 58, and a fluid passage 56a, as shown in FIG. 4.

The speed ratio control switching valve 56 switches the oil chambers (the first oil chambers 550c and 550c or the second oil chambers 550d and 550d) to which hydraulic fluid is to be supplied by switching the position of a valve in which a plurality of fluid passages are formed. This switching is performed by adjusting the difference between the repulsion force of a spring arranged in a cylinder and the pressure of a fluid such as air or hydraulic fluid supplied to that cylinder. The pressure of the fluid is controlled by an electronic control unit (ECU), which will be described later.

Figure 5A:
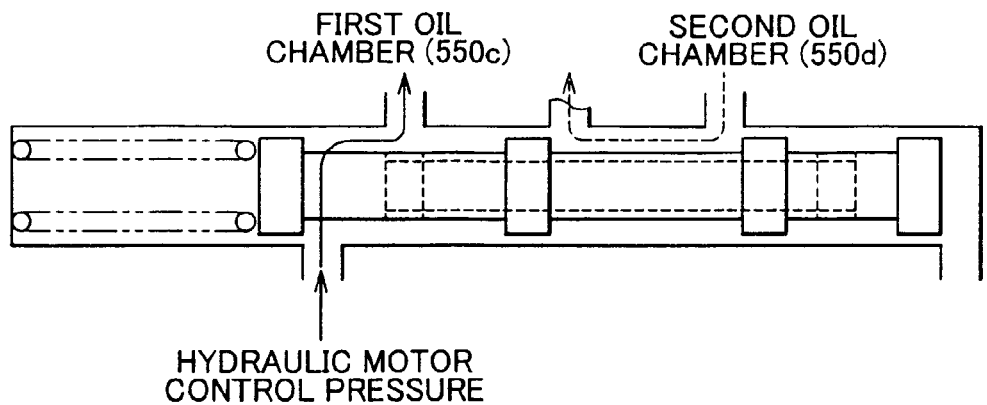
FIG. 5A is a view illustrating the operation of a speed ratio control switching valve according to the first exemplary embodiment, the drawing illustrating a valve position when hydraulic pressure is supplied to a first oil chamber.
Figure 5B:
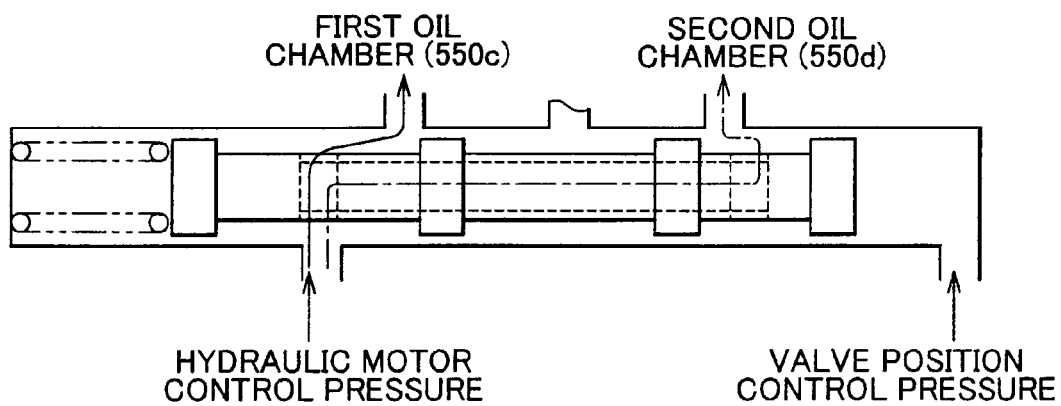
FIG. 5B is a view illustrating the operation of a speed ratio control switching valve according to the first exemplary embodiment, the drawing illustrating a valve position when hydraulic pressure is supplied to both the first oil chamber and a second oil chamber.

When the valve in the speed ratio control switching valve 56 is switched to a position that allows hydraulic fluid to be supplied to the first oil chambers 550c and 550c, as shown in FIG. 5A, the hydraulic motor 550 rotates in the normal direction. Conversely, when the valve in the speed ratio control switching valve 56 is switched to a position that allows hydraulic fluid to be supplied to the second oil chambers 550d and 550d, as shown in FIG. 5B, the hydraulic motor 550 rotates in the reverse direction.

Figure 5C:
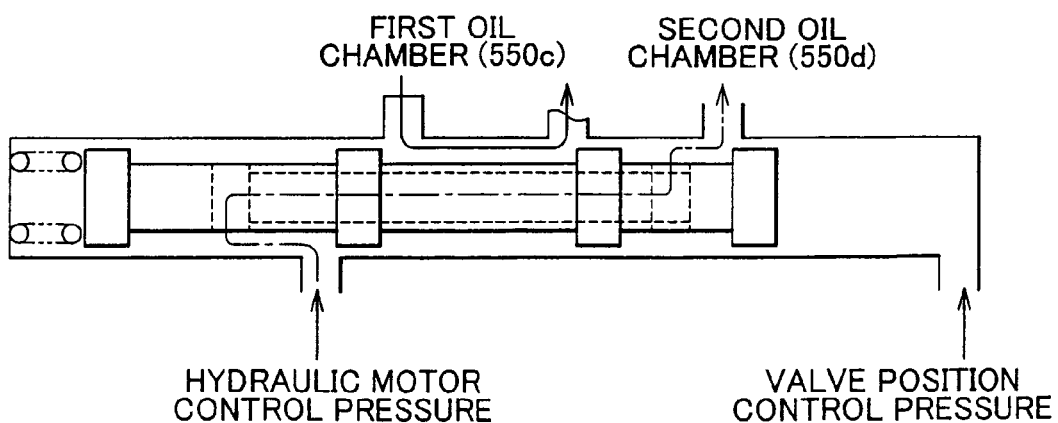
FIG. 5C is a view illustrating the operation of a speed ratio control switching valve according to the first exemplary embodiment, the drawing illustrating a valve position when hydraulic pressure is supplied to the second oil chamber.

Also, when the valve in the speed ratio control switching valve 56 is switched to a position that allows hydraulic fluid of the same pressure to be supplied to both the first oil chambers 550c and 550c and the second oil chambers 550d and 550d, as shown in FIG. 5C, the hydraulic motor 550 stops rotating altogether. Therefore, the speed ratio control switching valve 56 can also be used when the speed ratio is fixed.

In this way, according to the first exemplary embodiment, the hydraulic motor 550 and the movable sheave 53 are integrally arranged on the primary shaft 51, which enables them to be situated in a compact manner, thereby enabling the movable sheave sliding mechanism 55 that slides the movable sheave 53 to be compact. Making the movable sheave sliding mechanism 55 compact in turn enables the belt type CVT 1 itself to be made compact. Moreover, using the hydraulic motor 550 such as the vane motor described above and providing the moving direction converting mechanism 551 also described above obviates the need for the set of gears to transmit the driving force from the motor to the movable sheave 53, which enables the movable sheave sliding mechanism 55 and the belt type CVT 1 to be even more compact.

Further, since the moving direction converting mechanism 551 is used to slide the movable sheave 53 as described above, there is no driving loss generated by the set of gears as in the related art so the driving loss at the movable sheave sliding mechanism 55 can be reduced.

Moreover, a pushing mechanism is provided on the primary shaft 51 in the first exemplary embodiment. This pushing mechanism pushes the movable sheave 53 toward the fixed sheave 52, thereby generating a squeezing force in the axial direction between the fixed sheave 52 and the movable sheave 53.

The pushing mechanism includes a hydraulic pressure chamber 57 shown in FIG. 4 formed between the hydraulic motor 550 (the outer rotor 550a) and the movable sheave 53, a fluid passage 51d shown in FIG. 4 formed in the primary shaft 51, for example, which connects to the hydraulic pressure chamber 57, and the squeezing pressure regulating valve 58 shown in FIG. 4 which is connected to the fluid passage 51d.

In this way, in the first exemplary embodiment the hydraulic motor 550 (the outer rotor 550a) forms part of the hydraulic pressure chamber 57, which enables the pushing mechanism to be made smaller, thus helping to make the belt type CVT 1 more compact.

The pushing mechanism generates squeezing pressure between the fixed sheave 52 and the movable sheave 53 by supplying hydraulic pressure from the squeezing pressure regulating valve 58, which is the supply pressure of the hydraulic fluid regulated by the ECU, to the hydraulic pressure chamber 57. This squeezing pressure prevents a belt 80, to be described later, from slipping. Also, the hydraulic pressure chamber 57 is provided in series with the hydraulic motor 550 (the outer rotor 550a) in the axial direction of the primary shaft 51 so that hydraulic pressure within the hydraulic pressure chamber 57 can push the movable sheave 53 toward the fixed sheave 52. As a result, output from the hydraulic motor 550 can be reduced, which enables the hydraulic motor 550 to be made smaller, in turn making the belt type CVT 1 more compact.

Here, the squeezing pressure regulating valve 58 is connected to the speed ratio control switching valve 56 described above via the fluid passage 56a shown in FIG. 4. Hydraulic pressure from the squeezing pressure regulating valve 58 is supplied via the speed ratio control switching valve 56 to the first oil chambers 550c and 550c and the second oil chambers 550d and 550d in the hydraulic motor 550.

Also, because the hydraulic pressure chamber 57 and the first and second oil chambers 550c and 550d in the hydraulic motor 550 are arranged facing one another in the axial direction of the primary shaft 51 and the pressures in these oil chambers are the same, the internal pressure between the hydraulic pressure chamber 57 and the first and second oil chambers 550c and 550d cancels out. Therefore, the wall surface of the hydraulic motor 550 (the outer rotor 550a) between the hydraulic pressure chamber 57 and the first and second oil chambers 550c and 550d can be made thin, thus reducing weight.

Further, the hydraulic pressure chamber 57 and the first and second oil chambers 550c and 550d of the hydraulic motor 550 are connected via the fluid passage 51d, the fluid passage 56a, the speed ratio control switching valve 56, the fluid passage 51b, and the fluid passage 51c. Therefore, the hydraulic fluid is able to flow back and forth between the hydraulic pressure chamber 57 and the first and second oil chambers 550c and 550d. This is particularly useful when there is a sudden downshift. That is, being able to supply the hydraulic fluid that was discharged from the hydraulic pressure chamber 57, which will be described later, to the second oil chambers 550d and 550d improves response during a speed ratio change. Moreover, enabling the hydraulic fluid to flow back and forth reduces the consumption amount of hydraulic fluid supplied from the oil pump OP, which in turn enables the oil pump OP to be made smaller.

Next, a secondary pulley 60 shown in FIG. 1 is mounted to the secondary shaft 61. This secondary pulley 60 includes a fixed sheave 62 mounted integrally to the outer peripheral of the secondary shaft 61 and the movable sheave 63 which is able to slide in the axial direction of the secondary shaft 61. This movable sheave 63 is spline-fitted to the secondary shaft 61 with splines 64 shown in FIG. 6. Also, a V-shaped groove 80b is formed between opposing surfaces of the fixed sheave 62 and the movable sheave 63.

Furthermore, a pushing mechanism is provided on the secondary shaft 61. This pushing mechanism pushes the movable sheave 63 toward the fixed sheave 62, thereby generating a squeezing force in the axial direction between the fixed sheave 62 and the movable sheave 63. Two types of pushing mechanisms are provided in this first exemplary embodiment: a torque cam 65 and a hydraulic pressure chamber 66.

Figure 6:
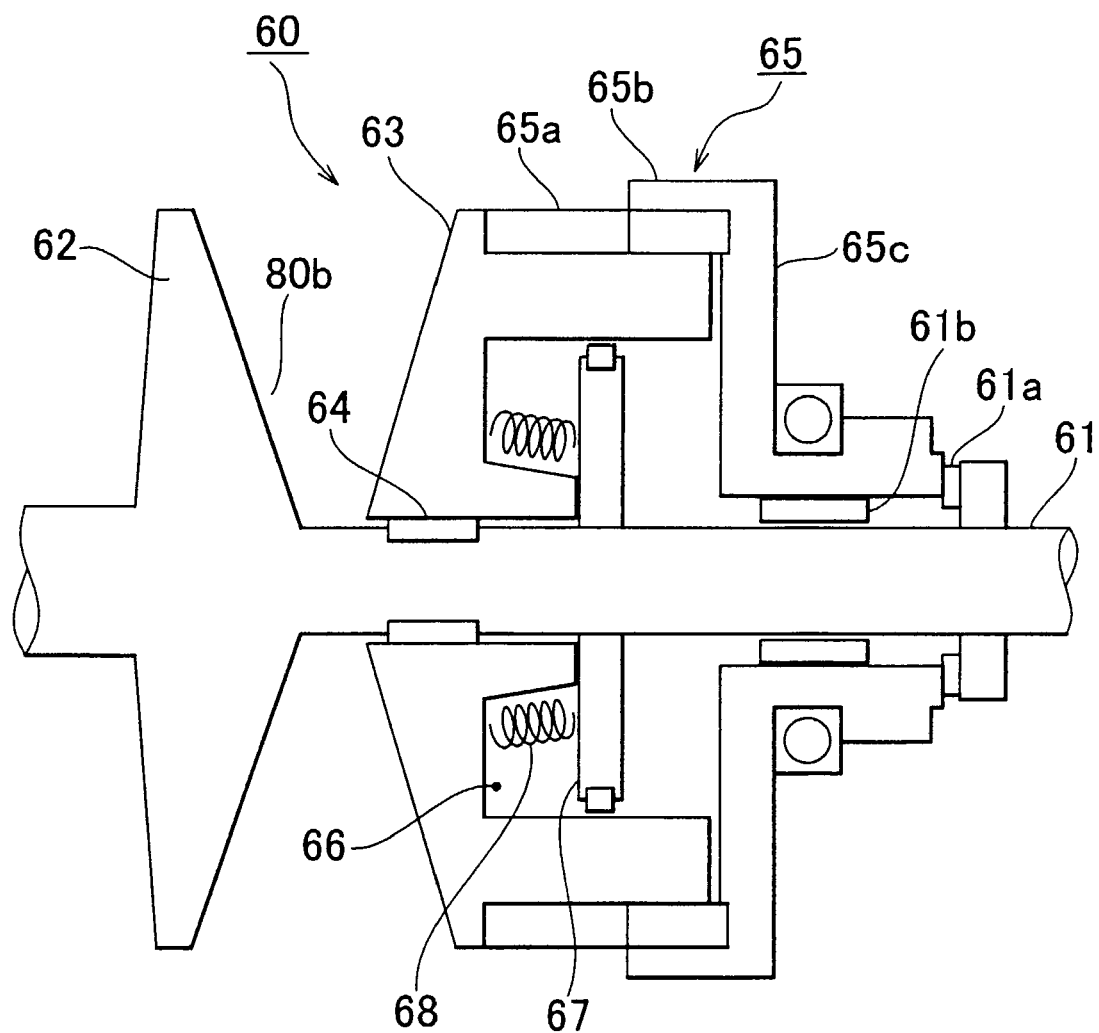
FIG. 6 is a view showing the structure of a secondary pulley side of the belt type continuously variable transmission according to the first exemplary embodiment of the invention.
Figure 7A:
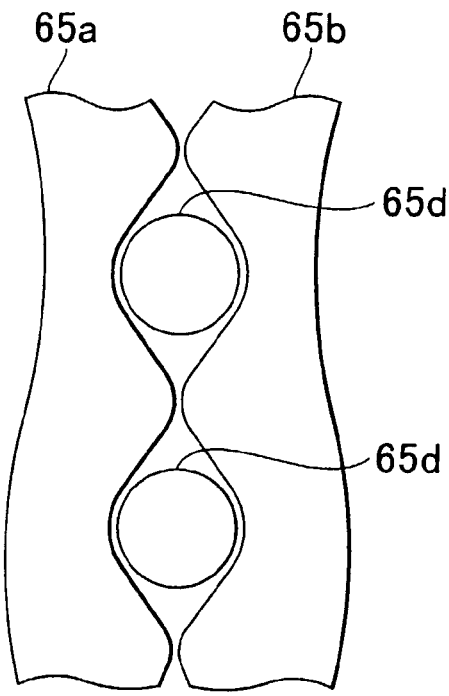
FIG. 7A is a view illustrating a torque cam according to the first exemplary embodiment of the invention, the drawing showing an example of a case in which a fixed sheave and a movable sheave of a secondary pulley are apart from one another.
Figure 7B:
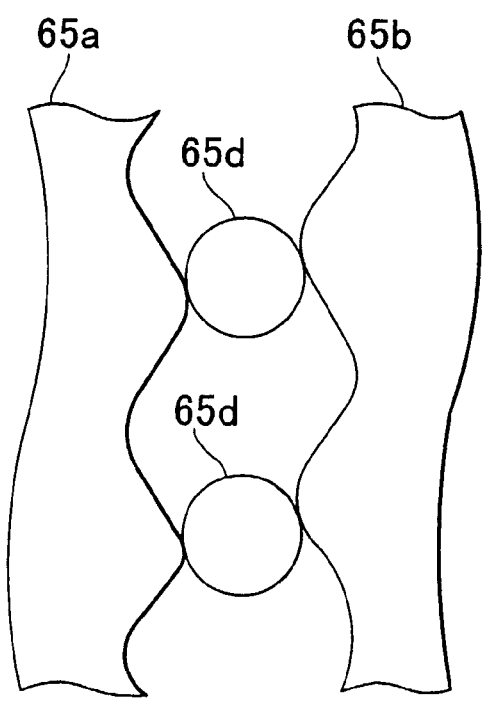
FIG. 7B is a view illustrating a torque cam according to the first exemplary embodiment of the invention, the drawing showing an example of a case in which the fixed sheave and the movable sheave of the secondary pulley are close to each other.

First, as shown in FIGS. 6, 7A, and 7B, for example, the torque cam 65 according to this first exemplary embodiment includes a mountain-and-valley-shaped first engaging portion 65a provided annularly around the movable sheave 63, a torque cam main body 65c which has a mountain-and-valley-shaped second engaging portion 65b facing the first engaging portion 65a, and a plurality of spherical members 65d arranged between the first and second engaging portions 65a and 65b.

A bearing 61a shown in FIG. 6 that is fixed to the secondary shaft 61 and a bearing 61b arranged between the torque cam main body 65c and the secondary shaft 61 enables the torque cam main body 65c to rotate relative to both the secondary shaft 61 and the movable sheave 63 around the rotational axes thereof.

Accordingly, even if the movable sheave 63 moves closer to the fixed sheave 62, for example, (in other words, even if the first engaging portion 65a moves away from the second engaging portion 65b), relative rotation between the torque cam main body 65c and the movable sheave 63 which rotates together with the secondary shaft 61 changes the torque cam 65 from the state shown in FIG. 7A to the state shown in FIG. 7B, which enables surface pressure to be generated between the first engaging portion 65a, the second engaging portion 65b, and the spherical members 65d. Accordingly, the second engaging portion 65b and the spherical members 65d push on the first engaging portion 65a, thus generating a squeezing force between the fixed sheave 62 and the movable sheave 63, making it possible to prevent the belt 80 from slipping.

Further, since the torque cam main body 65c and the movable sheave 63 rotate relative to one another, the movable sheave 63 and the fixed sheave 62 will not wrench on each other even if the torque cam main body 65c generates thrust against the movable sheave 63. As a result, durability of the belt 80 can be improved and the range of the speed ratio is able to be increased. This in turn enables the relative positions of the primary pulley 50 and the secondary pulley 60 to be maintained at their respective initial settings, which also contributes to improved durability.

The pressure from the surface pressure against the thrust of the torque cam 65 can be received by the secondary shaft 61 via the bearing 61a. In this way, the pressure does not act on static systems and the bearing 61a rotates almost not at all, so loss at the bearing 61a can be reduced, just like with the primary pulley 50.

Further, the working areas of the torque cam 65 (i.e., the first and second engaging portions 65a and 65b, and the spherical members 65d) are arranged on the outer diameter side of the movable sheave 63, which reduces the surface pressure between the first engaging portion 65a, the second engaging portion 65b, and the spherical member 65d.

The hydraulic pressure chamber 66 in the first exemplary embodiment is formed by a hollow portion on the opposite side of the movable sheave 63 from the groove 80b and a cylindrical member 67 that is formed on, and concentric with, the secondary shaft 61.

This hydraulic pressure chamber 66 is on the inner diameter side of the movable sheave 63 so its volume can be made small. Accordingly, the volumetric flow of hydraulic fluid into the hydraulic pressure chamber 66 during a sudden shift or the like is able to be reduced.

The hydraulic pressure chamber 66 is connected, for example, to the fluid passage 61c shown in FIG. 4 formed in the secondary shaft 61, and is further connected to the squeezing pressure regulating valve 58 via the fluid passage 51d which is connected to the fluid passage 61c.

In this way, the pushing mechanism of the primary pulley 60 formed of the hydraulic pressure chamber 66, the fluid passage 61c, and the squeezing pressure regulating valve 58 prevents the belt 80 from slipping by generating the squeezing force between the fixed sheave 62 and movable sheave 63 by supplying hydraulic pressure from the squeezing pressure regulating valve 58, which is the supply pressure of the hydraulic fluid regulated by the ECU, to the hydraulic pressure chamber 66.

Also, even if there is a disturbance in the torque such as may occur during a speed ratio change (when the movable sheave 63 in the secondary pulley 60 is driven or stopped) such that thrust from the torque cam 65 is unable to be obtained, the desired squeezing force is still able to be generated by the pushing mechanism formed by the hydraulic pressure chamber 66 and the like which operates by hydraulic pressure independent of the torque cam 65. As a result, it is possible to more reliably prevent the belt 80 from slipping, in turn making it possible to improve reliability and drivability.

An elastic member 68 such as a coil spring is provided in the hydraulic pressure chamber 66 in the first exemplary embodiment. One end of this elastic member 68 is fixed to a wall surface of the hollow portion in the movable sheave 63, while the other end is fixed to the cylindrical member 67.

In the first exemplary embodiment, the torque cam 65 is set by the cam angle (e.g., nonlinear cam) such that the thrust from the torque cam 65 is lower than the required thrust and the difference between the two is made up for by the pushing mechanism, formed by the 66 and the like, and/or the elastic member 68. As a result, the belt 80 is not squeezed by more force than is necessary, thereby improving its durability which reduces loss at the belt 80 and improves power transmitting efficiency.

Further, it is also possible to have the pushing mechanism formed by the hydraulic pressure chamber 66 and the like and/or the elastic member 68 receive the thrust corresponding to the torque when the internal combustion engine 10 is not being driven. Doing so suppresses movement of the movable sheave 63 which can occur when the torque cam 65 operates (i.e., shifting), thereby enabling a constant speed ratio to be maintained. The belt squeezing force is also able to be maintained at the required value.

Moreover, the pushing mechanism on the secondary pulley 60 side is not necessarily limited to the two types as described in this exemplary embodiment, but may alternatively be one type or three or more types. Providing at least two types of pushing mechanisms is preferable for increasing control over the squeezing force between the fixed sheave 62 and the movable sheave 63. That is, control over the squeezing pressure can be improved by dividing the squeezing pressure between the pushing mechanisms and having at least one of those pushing mechanisms (the hydraulic pressure chamber 66 in the first exemplary embodiment) operate by hydraulic pressure.

Next, a counter drive pinion 92 is fixed to the internal combustion engine 10 side of the secondary shaft 61 with bearings 87 and 88 of the secondary shaft 61 arranged on both sides of the counter drive pinion 92.

A power transmission path 90 having an intermediate shaft 91 that is parallel to the secondary shaft 61 is provided between the counter drive pinion 92 and the final reduction gear 70, which will be described later. This intermediate shaft 91 is rotatably supported by bearings 85 and 86 and includes a counter driven gear 93, which is in mesh with the counter drive pinion 92, and a final drive pinion 94.

A parking gear 102 is arranged between the secondary pulley 60 on the secondary shaft 61 and the transaxle cover 23.

In this belt type CVT 1, the belt 80 is wound around the V-shaped grooves 80a and 80b of the primary pulley 50 and the secondary pulley 60. This belt 80 is an endless belt made up of a plurality of metal pieces and a plurality of steel rings, which transmits torque that was transmitted from the internal combustion engine 10 to the primary pulley 50, from the primary pulley 50 to the secondary pulley 60.

Next, the final reduction gear 70 will be described. This final reduction gear 70 includes a hollow differential case 71, a pinion shaft 72, pinions 73 and 74, and side gears 75 and 76.

The differential case 71 is rotatably supported by bearings 77 and 78. A ring gear 79 which is in mesh with the final drive pinion 94 is provided on the outer periphery of the differential case 71.

The pinions 73 and 74 are fixed to the pinion shaft 72, and the pinion shaft 72 is mounted in the hollow portion of the differential case 71.

Also, the side gears 75 and 76 are both fixed to a drive shaft (a front drive shaft, in this case) on which a vehicle wheel 100 is mounted.

Inside the transaxle case 22 structured as described above, lubricating oil stored in the bottom portion (an oil pan) of the transaxle case 22 is picked up by the rotating ring gear 79 and transmitted and dispersed to the meshing surfaces of the various gears 94, 93, and 92. As a result, the lubricating oil lubricates the various structural members (such as the various shafts 101, 91, 61 and the various bearings 83 to 88 and the like) in the final reduction gear 70 and the like. The lubricating oil also lubricates the primary shaft 51 and the like by dripping onto them after being kicked up and hitting the inside wall surface of the transaxle case 22.

The various structural elements starting with the belt type CVT 1 are controlled by the electronic control unit (ECU), not shown, based on information provided by various sensors. Data for performing shift control of the belt type CVT 1, such as data for controlling the speed ratio of the belt type CVT 1 in response to the running conditions based on information such as the accelerator opening amount and the vehicle speed, for example, is stored in advance in the ECU. Operation of the movable sheave sliding mechanism 55 and the pushing mechanisms (i.e., the torque cam 65 and the hydraulic pressure chamber 66) during control of the speed ratio will now be described in detail.

First, a case in which the speed ratio is reduced for acceleration will be described. The ECU in this case controls the regulator valve 59, the squeezing pressure regulating valve 58, and the speed ratio control switching valve 56 to supply hydraulic fluid into the first oil chambers 550c and 550c so as to move the movable sheave 53 closer to the fixed sheave 52 in order to achieve a winding radius of the belt 80 on the primary pulley 50 that corresponds to the desired speed ratio.

In this case, the ECU adjusts the valve position as shown in FIG. 5A by controlling the pressure of the working fluid in the speed ratio control switching valve 56. As a result, hydraulic fluid is supplied to the first oil chambers 550c and 550c while being drained from the second oil chambers 550d and 550d, such that the outer rotor 550a of the hydraulic motor 550 rotates relative to the primary shaft 51.

As a result of this rotation of the hydraulic motor 550, the movable sheave 53 of the primary pulley 50 moves closer to the fixed sheave 52 via the power transmitting portion 551, while the movable sheave 63 of the secondary pulley 60 moves away from the fixed sheave 62, thus reducing the speed ratio.

At this time, the movable sheave 63 of the secondary pulley 60 rotates together with the fixed sheave 62, the secondary shaft 61, and the bearing 61a, causing relative rotation between the movable sheave 63 and the torque cam main body 65c such that the torque cam 65 changes from being in the separated state shown in FIG. 7B to the close state shown in FIG. 7A, for example. As a result, squeezing force is generated between the fixed sheave 52 and the movable sheave 53, thereby preventing the belt 80 from slipping.

Also, when the movable sheaves 53 and 63 slide, hydraulic fluid is supplied to the hydraulic pressure chamber 57 of the primary pulley 50 via the fluid passage 51d while hydraulic fluid is discharged from the hydraulic pressure chamber 66 of the secondary pulley 60 via the fluid passage 61c. By supplying hydraulic fluid to the hydraulic pressure chamber 57 in the primary pulley 50, the movable sheave 53 is pushed in the sliding direction. This pushing pressure assists the sliding force of the movable sheave 53 by the hydraulic motor 550. Therefore, because the movable sheave 53 is able to be slid sufficiently even when the hydraulic motor 550 is a low output motor, a small hydraulic motor 550 with reduced output is able to be used.

The fluid passage 51d and the fluid passage 61c are connected to each other, as shown in FIG. 4, so hydraulic fluid that drains from the hydraulic pressure chamber 66 in the secondary pulley 60 can be supplied to the hydraulic pressure chamber 57 in the primary pulley 50. Further, the hydraulic fluid that is drained from the hydraulic pressure chamber 66 can also be supplied to the first oil chambers 550c and 550c via the speed ratio control switching valve 56. Circulating the drained hydraulic fluid and sending it to other oil chambers in this way reduces the amount of hydraulic fluid consumed, thus making it possible to make the oil pump OP compact.

As described above, after the speed ratio change described above has ended, the ECU adjusts the valve position of the speed ratio control switching valve 56 as shown in FIG. 5B such that the same hydraulic pressure is applied from the squeezing pressure regulating valve 58 to the first oil chambers 550c and 550c and the second oil chambers 550d and 550d. Accordingly, the hydraulic motor 550 stops rotating relative to the primary shaft 51 and starts to rotate together with the primary shaft 51 and the movable sheave 53. Therefore, since there is no more difference in rotation between the hydraulic motor 550 and the primary shaft 51 and the movable sheave 53, loss due to needless relative rotation and friction and the like between them is able to be reduced.

Here, the hydraulic pressure from the squeezing pressure regulating valve 58 is applied to both the hydraulic pressure chamber 57 in the primary pulley 50 as well as the hydraulic pressure chamber 66 in the secondary pulley 60. As a result, squeezing pressure is generated between the fixed sheave 52 and the movable sheave 53 in the primary pulley 50, as well as between the fixed sheave 62 and the movable sheave 63 in the secondary pulley 60, thereby preventing the belt 80 from slipping.

Next, a case in which the speed ratio is increased for deceleration will be described. The ECU in this case controls the regulator valve 59, the squeezing pressure regulating valve 58, and the speed ratio control switching valve 56 to supply hydraulic fluid to the second oil chambers 550d and 550d so as to move the movable sheave 53 away from the fixed sheave 52 in order to achieve a winding radius of the belt 80 on the primary pulley 50 that corresponds to the desired speed ratio.

In this case, the ECU adjusts the valve position as shown in FIG. 5C by controlling the pressure of the working fluid in the speed ratio control switching valve 56. As a result, hydraulic fluid is supplied to the second oil chambers 550d and 550d while being drained from the first oil chambers 550c and 550c, such that the outer rotor 550a of the hydraulic motor 550 rotates relative to the primary shaft 51.

As a result of this rotation of the hydraulic motor 550, the movable sheave 53 of the primary pulley 50 moves away from the fixed sheave 52 via the power transmitting portion 551, while the movable sheave 63 of the secondary pulley 60 moves closer to the fixed sheave 62, thus increasing the speed ratio.

At this time, the movable sheave 63 of the secondary pulley 60 rotates together with the fixed sheave 62, the secondary shaft 61, and the bearing 61a, causing relative rotation between the movable sheave 63 and the torque cam main body 65c such that the torque cam 65 changes from being in the close state shown in FIG. 7A to the separated state shown in FIG. 7B, for example. As a result, squeezing force is generated between the fixed sheave 52 and the movable sheave 53, thereby preventing the belt 80 from slipping.

Also, hydraulic fluid in the hydraulic pressure chamber 57 of the primary pulley 50 drains through the fluid passage 51*d* and is supplied to the hydraulic pressure chamber 66 of the secondary pulley 60 through the fluid passage 61*c*. In this case, the hydraulic fluid drained from the hydraulic pressure chamber 57 of the primary pulley 50 is supplied to the hydraulic pressure chamber 66 of the secondary pulley 60 and the second oil chambers 550*d* and 550*d* of the primary pulley 50. This is useful not only for reducing the capacity of the oil pump OP, as described above, but especially for improving response to a speed ratio change because hydraulic fluid in the hydraulic pressure chamber 57 can be supplied to the second oil chambers 550*d* and 550*d* and the hydraulic motor 550 can be rotated immediately for a sudden downshift.

The operation after the speed ratio change is just like that when the speed ratio is increased.

As described above, the belt type CVT 1 according to the first exemplary embodiment enables the transmission to be made more compact as well as reduces driving loss due to the rotation of various structural parts.

A belt type continuously variable transmission according to a second exemplary embodiment of the invention will now be described with reference to FIGS. 8 and 9.

Figure 8:
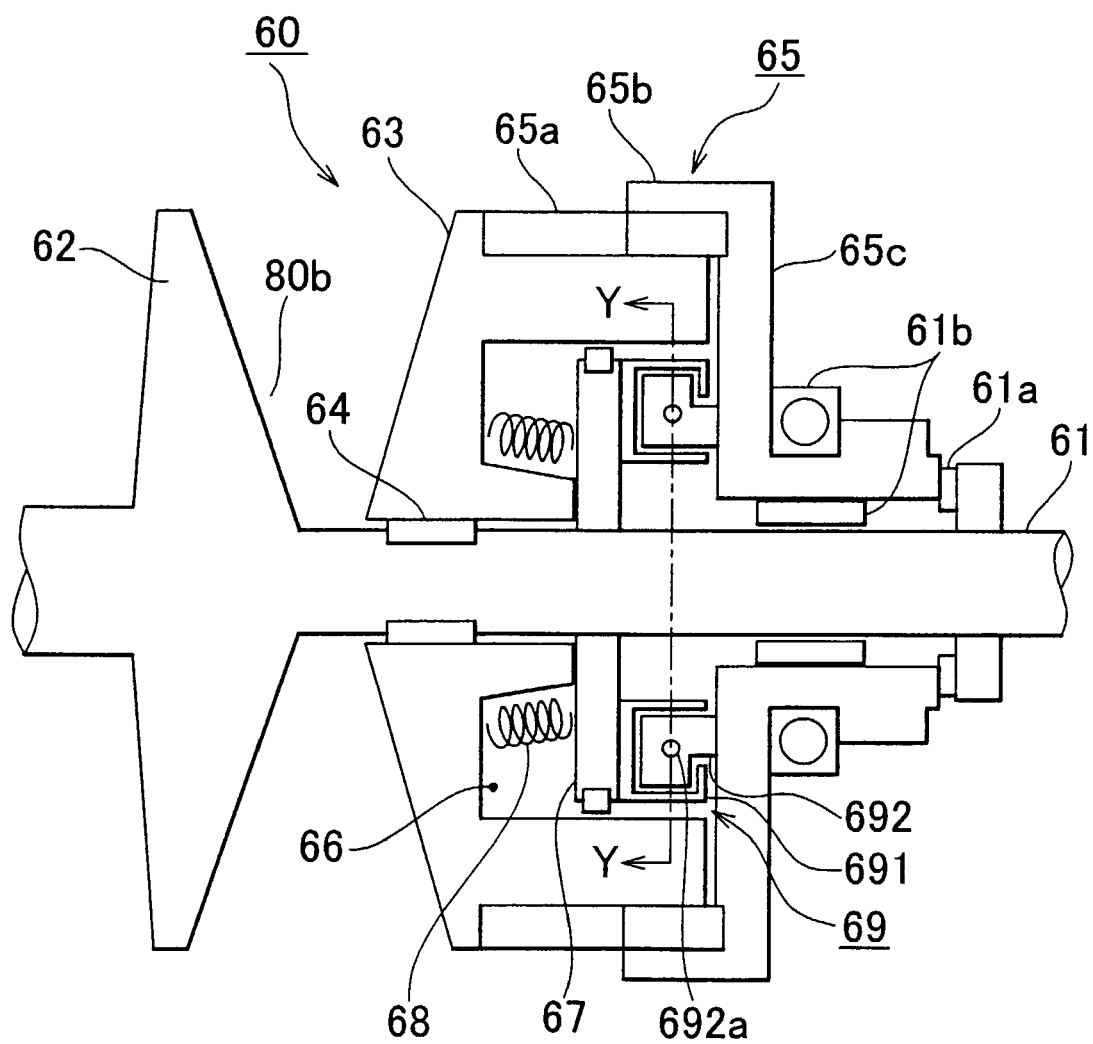
FIG. 8 is a view of the structure of a secondary pulley side of a belt type continuously variable transmission according to a second exemplary embodiment of the invention.
Figure 9:
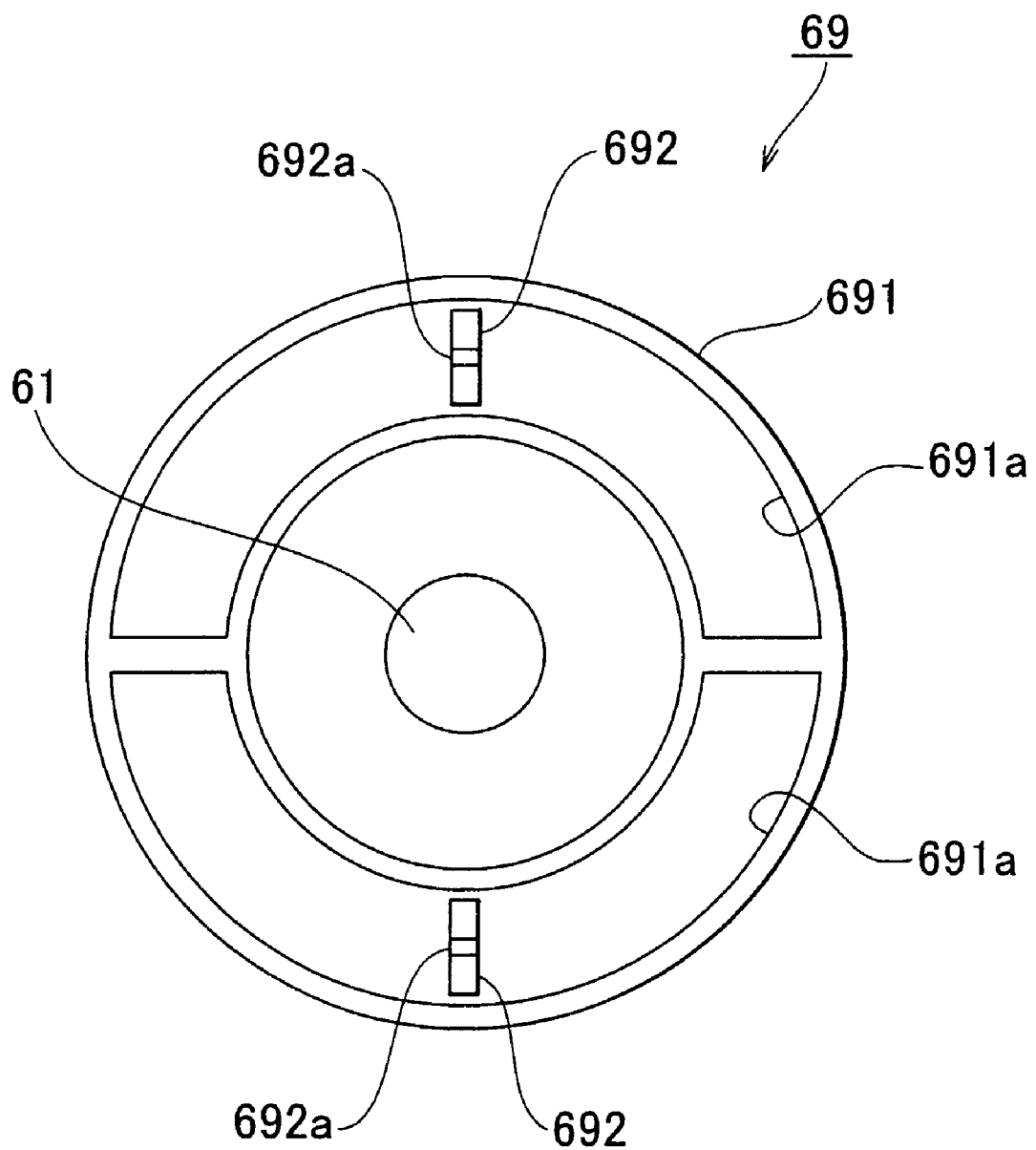
FIG. 9 is a sectional view of an absorbing mechanism shown taken along line Y-Y in FIG. 8.

The belt type CVT 1 according to the second exemplary embodiment is the same as the belt type CVT 1 in the first exemplary embodiment except for that an absorbing mechanism 69 shown in FIGS. 8 and 9 is provided on the secondary pulley 60 of the belt type CVT 1 of the first exemplary embodiment.

This absorbing mechanism 69 includes a donut shaped outer case 691 arranged on the cylindrical member 67 and two plate members 692 provided upright on the torque cam main body 65*c*. The outer case 691 has two hollow portions 691*a* inside that are filled with a viscous fluid (such as hydraulic fluid), and rotates together with the cylindrical member 67. The plate members 692 each have a through-hole (orifice) 692*a* formed in the surface, and rotate together with the torque cam main body 65*c*.

One of the plate members 692 is arranged in each hollow portion 691*a* and when the outer case 691 and the plate members 692 rotate relative to one another, the plate members 692 rotate inside the hollow portions 691*a*. A gap is provided between the inner wall surface of the hollow portions 691*a* and the end portion of each of the plate members 692.

Accordingly, the plate members 692 are moved in the hollow portions 691*a* by operating the torque cam 65 during a speed ratio change. At that time, resistance is generated by the viscous fluid flowing through the orifices 692*a* and the gaps such that the relative motion between the torque cam main body 65*c* and the movable sheave 63 is smooth. As a result, shock generated when the clearance in the torque cam 65 is taken up during a speed ratio change (i.e., when the torque cam 65 is switched between the driving and driven states) can be reduced.

The degree of the resistance is adjusted by the gap between the end portion of the plate members 692 and the hollow portions 691*a* and the diameters of the orifices 692*a*.

Also, the middle portion of the hollow portions 691*a* shown in FIG. 9 of the absorbing mechanism 69 can be made wider than both end portions of the hollow portions 691*a* such that the degree of absorption can be changed depending on the speed ratio. That is, the hollow portions 691*a* can be formed with widths that change in the circumferential direction such that the gaps between the end portions of the plate members 692 and the inner wall surface of the hollow portions 691*a* are wider when the plate members 692 are positioned in the middle portions of the hollow portions 691*a* and smaller as the plate members 692 approach the side end portions of the hollow portions 691*a*.

As a result, the rate at which the plate members 692 move increases when they are positioned at the middle portions of the hollow portions 691*a* and decreases as they approach the ends of the hollow portions 691*a*. Accordingly, the degree of absorption (absorbing power) changes according to the speed ratio such that shock generated when the clearance in the torque cam 65 is taken up can be reduced. For example, setting the gap so that there is a lot of absorbing power during a downshift improves drivability.

Since the movable sheave 63 is mounted on the secondary shaft 61 using the splines 64, the movable sheave 63 and the fixed sheave 62 rotate in the same direction and at the same speed. Here, the absorbing mechanism 69 is not limited to being provided between the movable sheave 63 and the torque cam 65, as is described in this second exemplary embodiment, but may alternatively be provided on the fixed sheave 62 side. The absorbing mechanism 69 in this case may be structured such that a rotating member (not shown) which rotates together with the torque cam main body 65*c* is provided on the opposite side of the fixed sheave 62 from the groove 80*b*, the plate member 692 is mounted to that rotating member, and the outer case 691 is mounted to the fixed sheave 62. This rotating member may be independent of the torque cam 65, or may be an extension of the torque cam main body 65*c*, for example.

Next, a belt type continuously variable transmission according to a third exemplary embodiment of the invention will be described with reference to FIG. 10.

Figure 10:
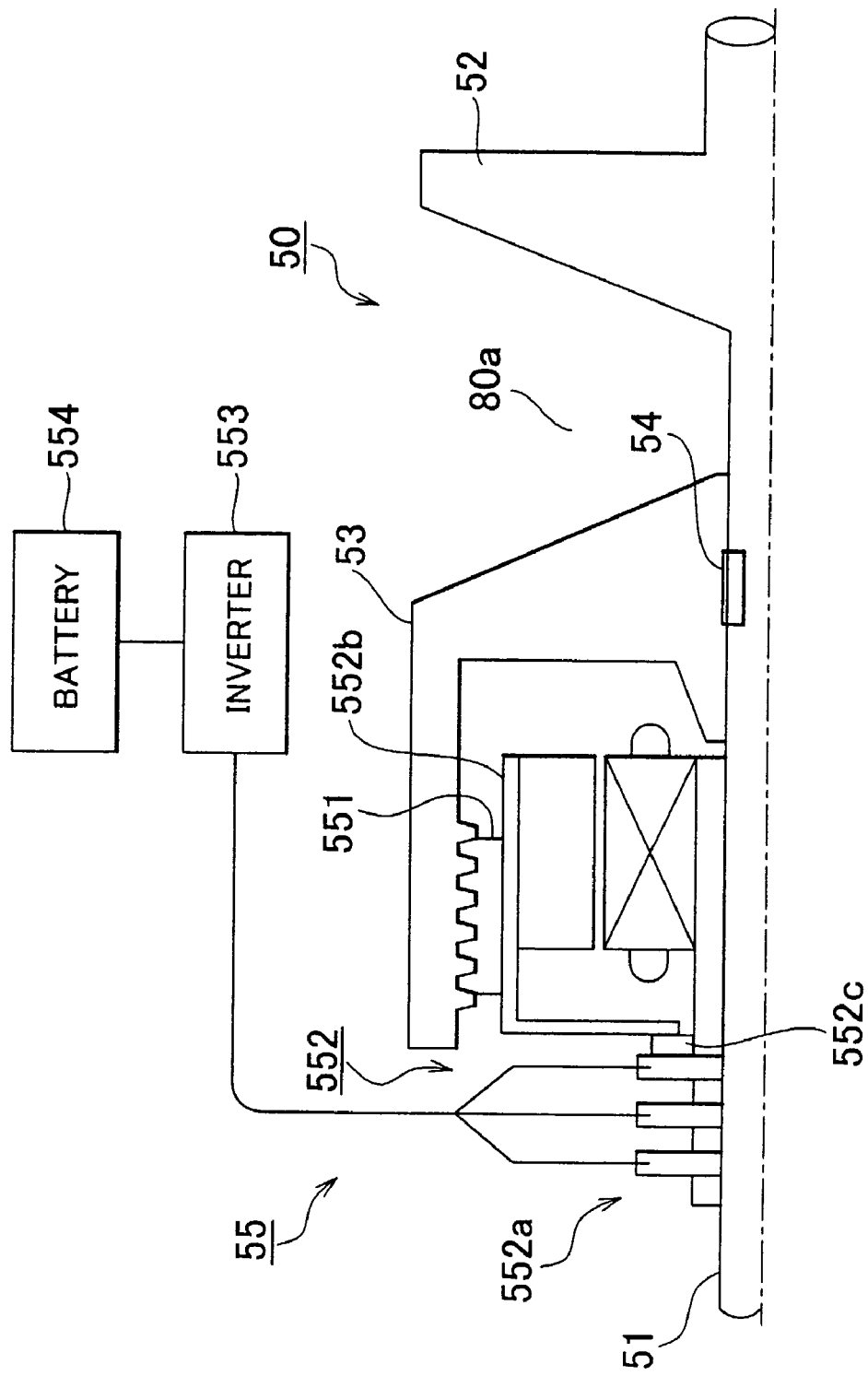
FIG. 10 is a view of the structure of a primary pulley side of a belt type continuously variable transmission according to a third exemplary embodiment of the invention.

The belt type CVT 1 according to the second exemplary embodiment is the same as the belt type CVT 1 in the first and second exemplary embodiments except for that the hydraulic motor 550 of the movable sheave sliding mechanism 55 in the first and second exemplary embodiments is changed to an electric motor 552 shown in FIG. 10.

The electric motor 552 is arranged in the hollow portion on the opposite side of the movable sheave 53 from the groove 80*a* and concentric with the primary shaft 51. By supplying power to a three phase alternating current brush 552*a* which is connected to a battery 554 via an inverter 553, the electric motor 552 rotates the outer rotor 552*b* relative to the primary shaft 51 via a bearing 552*c*. Here, the electric motor 552 is switched between normal rotation and reverse rotation by controlling the power supplied to the three phase alternating brush 552*a* with the ECU.

Also, a moving direction converting mechanism 551 which is the same as that in the first and second exemplary embodiments is provided between the outer peripheral portion of the outer rotor 552*b* and the inner wall surface of the hollow portion in the movable sheave 53. As a result, the movable sheave 53 is able to be slid in the axial direction of the primary shaft 51 by driving the electric motor 552.

In this way, using the electric motor 552 of the structure and arrangement in the third embodiment enables the belt type CVT 1 to be more compact as well as reduces driving loss, just as do the first and second exemplary embodiments.

Although not shown in the drawings, the hydraulic pressure chamber 57 may also be provided between the electric motor 552 and the movable sheave 53 in the third exemplary embodiment, just as in the first and second exemplary embodiments.

The foregoing first through the third exemplary embodiments illustrate examples in which a motor (the hydraulic motor 550 or the electric motor 552) is provided integrally with the movable sheave 53 on the primary pulley 50 side, but the invention is in no way limited to this. Alternatively, for example, a motor may be provided integrally with the movable sheave 63 on the secondary pulley 60 side, or one motor may be provided integrally with the movable sheave 53 on the primary pulley 50 while another motor is provided integrally with the movable sheave 63 on the secondary pulley 60.

Accordingly, the belt type continuously variable transmission according to this invention is particularly applicable for reducing both the size of a movable sheave sliding mechanism which slides a movable sheave using a motor, and the size of the transmission itself.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A belt type continuously variable transmission, comprising:
   - two pulley shafts arranged in parallel a predetermined distance apart from each other;
   - a movable sheave on each pulley shaft, the movable sheaves being able to slide in an axial direction on the pulley shafts;
   - a fixed sheave arranged on each pulley shaft so as to face the moveable sheave on each pulley shaft, the fixed sheave and the movable sheave that face each other on each pulley shaft together forming a groove therebetween;
   - a belt wound around the grooves between the movable sheaves and the fixed sheaves that face one another;
   - a motor that rotates in normal and reverse directions to drive one of the movable sheaves in the axial direction of a pulley shaft of the one of the moveable sheaves;
   - a moving direction converting mechanism that converts force in the direction of rotation, which is driving force of the motor, into force in the axial direction; and
   - a hydraulic pressure chamber, which pushes the one movable sheave toward the fixed sheave using hydraulic pressure, is provided between the motor and an inner radial surface of the one movable sheave in the axial direction,
   - wherein the motor is provided in a hollow portion of the one of the moveable sheaves, that is located opposite the groove, the hollow portion including an inner circumferential wall surface,
   - wherein the motor includes an outer rotor that is integrated with the one of the moveable sheaves and the outer rotor includes an outer peripheral portion disposed radially about the outer rotor, and
   - wherein the moving direction converting mechanism is disposed between the outer peripheral portion of the outer rotor and the inner circumferential wall surface of the hollow portion of the moveable sheave.

2. The belt type continuously variable transmission according to claim 1, further comprising an integral rotating mechanism which rotates the motor integrally with the movable sheave, and a relative moving mechanism that moves the motor and the movable sheave relative to one another in the axial direction.

3. The belt type continuously variable transmission according to claim 1, wherein the moving direction converting mechanism includes a moving screw portion.

4. The belt type continuously variable transmission according to claim 1, wherein the motor is provided with an inner rotor which is integrated with the pulley shaft and the outer rotor which generates driving force by rotating relative to the inner rotor; and the pulley shaft is provided with a bearing that rotates the outer rotor relative to the pulley shaft.

5. The belt type continuously variable transmission according to claim 4, wherein the moving direction converting mechanism includes a spline portion provided between the outer rotor and the movable sheave.

6. The belt type continuously variable transmission according to claim 1, wherein the hydraulic pressure chamber which pushes the movable sheave toward the fixed sheave using hydraulic pressure is provided in series with the motor in the axial direction.

7. The belt type continuously variable transmission according to claim 6, wherein at least one wall surface that forms the hydraulic pressure chamber is formed by the motor.

8. The belt type continuously variable transmission according to claim 7, wherein the motor is a hydraulic motor and an oil chamber in the motor and the hydraulic pressure chamber are arranged facing one another in the axial direction across the wall surface formed by the motor.

9. The belt type continuously variable transmission according to claim 8, wherein the oil chamber in the motor and the hydraulic pressure chamber are connected to each other.

10. The belt type continuously variable transmission according to claim 1, wherein one of the pulley shafts is a primary side pulley shaft and the other of the pulley shafts is a secondary side pulley shaft, the movable sheave provided integrally with the motor is arranged on the primary side pulley shaft, and a plurality of pushing mechanisms that push the movable sheave toward the fixed sheave are provided on the movable sheave on the secondary side pulley shaft.

11. The belt type continuously variable transmission according to claim 10, wherein at least one of the pushing mechanisms is a torque cam.

12. The belt type continuously variable transmission according to claim 11, wherein an absorbing mechanism that makes the torque cam operate smoothly is provided on the fixed sheave on the secondary side pulley shaft or the movable sheave on the secondary side pulley shaft.

13. The belt type continuously variable transmission according to claim 12, wherein a structure which changes the degree of absorption according to the speed ratio is provided in the absorbing mechanism.

14. The belt type continuously variable transmission according to claim 1, wherein the outer rotor rotates relative to the moveable sheave.

15. A belt type continuously variable transmission, comprising:
   - two pulley shafts arranged in parallel a predetermined distance apart from each other;
   - a movable sheave on each pulley shaft, the movable sheaves being able to slide in an axial direction on the pulley shafts;
   - a fixed sheave arranged on each pulley shaft so as to face the moveable sheave on each pulley shaft, the fixed sheave and the movable sheave that face each other on each pulley shaft together forming a groove therebetween;
   - a belt wound around the grooves between the movable sheaves and the fixed sheaves that face one another; and a motor integrally provided with one of the movable sheaves and capable of driving the one of the movable sheaves, the motor being rotatable in normal and reverse directions to drive said movable sheave;

a hydraulic pressure chamber, which pushes the one movable sheave toward the fixed sheave using hydraulic pressure, is provided between the motor and an inner radial surface of the one movable sheave in the axial direction, wherein the motor includes an inner rotor that is integrally assembled with a pulley shaft of the one of the moveable sheaves and an outer rotor that generates driving force that drives the one of the moveable sheaves in the axial direction of the pulley shaft by rotating relative to the inner rotor, wherein the outer rotor is provided with an outer peripheral portion disposed radially about the outer rotor and the moveable sheave is provided with a hollow portion that includes an inner circumferential wall surface, and wherein a moving direction converting mechanism that converts force in the direction of rotation, which is a driving force of the motor, into a force in the axial direction is provided between the outer peripheral portion of the outer rotor and the inner circumferential wall surface of the hollow portion of the moveable sheave.

16. The belt type continuously variable transmission according to claim 15, wherein the moving direction converting mechanism includes a moving screw portion.

17. The belt type continuously variable transmission according to claim 15, wherein the hydraulic pressure chamber which pushes the movable sheave toward the fixed sheave using hydraulic pressure is provided in series with the motor in the axial direction.

18. The belt type continuously variable transmission according to claim 17, wherein at least one wall surface that forms the hydraulic pressure chamber is formed by the motor.

19. The belt type continuously variable transmission according to claim 18, wherein an oil chamber in the motor and the hydraulic pressure chamber are arranged facing one another in the axial direction across the wall surface formed by the motor.

20. The belt type continuously variable transmission according to claim 19, wherein the oil chamber in the motor and the hydraulic pressure chamber are connected to each other.

* * * * *